(12) United States Patent
Chapman

(10) Patent No.: US 11,872,833 B2
(45) Date of Patent: Jan. 16, 2024

(54) INFRARED EFFECT PRESERVED ON COPY

(71) Applicant: Xerox Corporation, Norwalk, CT (US)

(72) Inventor: Edward N. Chapman, Rochester, NY (US)

(73) Assignee: XEROX CORPORATION, Norwalk, CT (US)

( * ) Notice: Subject to any disclaimer, the term of this patent is extended or adjusted under 35 U.S.C. 154(b) by 222 days.

(21) Appl. No.: 17/536,000

(22) Filed: Nov. 27, 2021

(65) Prior Publication Data
US 2023/0166550 A1 Jun. 1, 2023

(51) Int. Cl.
*H04N 1/32* (2006.01)
*B42D 25/378* (2014.01)
*B42D 25/382* (2014.01)
*B41M 3/14* (2006.01)

(52) U.S. Cl.
CPC ......... *B42D 25/378* (2014.10); *B42D 25/382* (2014.10); *B41M 3/14* (2013.01)

(58) Field of Classification Search
USPC ...................................................... 358/3.28
See application file for complete search history.

(56) References Cited

U.S. PATENT DOCUMENTS

| | | |
|---|---|---|
| 9,781,294 B1 | 10/2017 | Chapman |
| 10,051,156 B2 | 8/2018 | Chapman et al. |
| 10,313,556 B1 | 6/2019 | Chapman |
| 10,805,494 B1 | 10/2020 | Chapman |
| 10,812,675 B1 | 10/2020 | Chapman |
| 10,977,536 B2 | 4/2021 | Walters et al. |
| 11,006,021 B1 * | 5/2021 | Ireland ............... H04N 1/32144 |
| 11,082,640 B2 | 8/2021 | Nagata et al. |
| 11,390,102 B1 * | 7/2022 | Chapman ............. H04N 1/6022 |
| 2014/0002558 A1 | 1/2014 | Ramesh et al. |
| 2023/0109676 A1 * | 4/2023 | Chapman ................ H04N 5/33 382/100 |

FOREIGN PATENT DOCUMENTS

EP 0599368 A1 6/1994

OTHER PUBLICATIONS

"CIELAB color space", Wikipedia, Retrieved from "https://en.wikipedia.org/w/index.php?title=CIELAB_color_space&oldid=1045708145", page last edited on Sep. 22, 2021, at 01:02 (UTC).

(Continued)

*Primary Examiner* — Kent Yip
(74) *Attorney, Agent, or Firm* — Ortiz & Lopez, PLLC; Kermit D. Lopez; Luis M. Ortiz

(57) ABSTRACT

Methods and system for creating an infrared effect that can survives copying, can involve providing a metameric pair of pattern inks, wherein a first pattern ink reflects higher in an infrared spectrum as compared to a second pattern ink among the metameric pair of pattern inks, wherein the second pattern ink is less reflective than the first pattern ink. For the second pattern ink that is less reflective than the first pattern ink, a pattern can be created for the second pattern ink that is larger and less scattered than an existing design for a pattern ink. A color of media can be used as a common color for the metameric pair of patterns and inks to create an infrared effect from the metameric pair of pattern inks that survives copying on the media.

20 Claims, 12 Drawing Sheets

(56) References Cited

OTHER PUBLICATIONS

"RGB color model", Wikipedia, Retrieved from "https://en.wikipedia.org/w/index.php?title=RGB_color_model&oldid=1046242091", page was last edited on Sep. 24, 2021, at 16:56 (UTC).
"Thermographic camera", Retrieved from "https://en.wikipedia.org/w/index.php?title=Thermographic_camera&oldid=1022740066", page was last edited on May 12, 2021, at 06:29 (UTC).
"Specialty Imaging, Fraud-Resistant Effects That Protect Your Most Sensitive Documents", Xerox Corporation, 2019.

* cited by examiner

INFRARED EFFECT PRESERVED ON COPY

TECHNICAL FIELD

Embodiments are related to image processing methods, systems and devices. Embodiments also relate to printing devices and techniques. Embodiments further relate to security features such as watermarks. Embodiments are further related to specialty imaging. Embodiments additionally to techniques and devices for rendering an infrared effect preserved on a copy (e.g., printed media). Embodiments further relate to techniques and devices for creating an infrared effect that can survive copying.

BACKGROUND

In conventional printing processes that may require security measures, a pattern color space having specialty imaging characteristics can be used to facilitate security measures and prevent counterfeiting of printed materials. Furthermore, in conventional printing processes, a pattern color space can be used, in part on variable data, such as printing logos, serial numbers, seat locations, or other types of unique identifying information on printed materials.

Security is an important requirement in many document production applications. In situations such as official or government document printing, event ticket printing, financial instrument printing and the like, many documents must be protected against copying, forging and/or counterfeiting. To accomplish this, printed documents often include security marks or security features that serve to prevent counterfeiting and/or identify a document as original.

Thus, in security applications, it may be desirable to add information to a document in the form of a security mark or a security feature that may prevent or hinder alterations and counterfeiting. Specialty imaging has been used, conventionally, in printed materials to provide fraud protection and anti-counterfeiting measures for such security applications. Some examples are in prescriptions, contracts, documents, coupons, and tickets. Typically, several specialty-imaging techniques are used at various positions in a document. In addition, these security elements may in some cases conflict with the overall aesthetics of the document.

Examples of specialty imaging include, but are not limited to, features such as the Xerox® MicroText Mark, Xerox® Correlation Mark, Xerox® GlossMark®, Xerox® Infrared Mark and Xerox® Fluorescent Mark, which add security to static and variable information (VI) jobs by making it difficult to counterfeit them. Using multiple effects—including visible ones—on an application makes reproducing it more costly than purchasing the original. Specialty imaging can also be used to add visual interest and sophistication to print jobs. Specialty imaging may also be used to add reflective text to enhance photos, illustrations and colored backgrounds.

In the area of security printing, documents can be protected from copying, forging and counterfeiting using multiple techniques. Specialty imaging is one such method for security printing, which can use standard material such as papers inks and toners. Typically, security printing companies in the marketplace require special (expensive) materials. An example documents is a prescription where a pharmacist would like to be able to have a good level of confidence that the document is genuine.

Many security printing effects either are destroyed or degraded by scanning or copying. This is often desired because this enables a person to discern the original from the copy. A smaller subset of documents involves cases where a copy or the original can be used and hence it is desired to have a security effect survive a copy or scan. Examples of such documents include social security cards and veteran discharge papers such as DD 214 forms.

One technique for specialty imaging involves the use of infrared (IR) text where a hidden message may only be seen under IR illumination with, for example, an IR camera. Typical IR effects use special IR inks and hence do not copy. Specialty imaging IR mark text is a popular anti-counterfeiting and anti-forging method for protecting valuable documents such as prescriptions and concert tickets. It is generally invisible unless viewed with an IR camera. One issue with this technique, however, is that the mark is sometimes able to be copied on a standard office copier, but the effect can degrade.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, an aspect of the embodiments to provide for an improved image processing method, system and apparatus.

It is another aspect of the embodiments to provide for improved for improved security features such as watermarks.

It is a further aspect of the embodiments to provide for improved specialty imaging techniques and devices.

It is also an aspect of the embodiments to provide methods and systems for creating an infrared effect that can survive copying.

The aforementioned aspects and other objectives and advantages can now be achieved as described herein. In an embodiment, a method of creating an infrared effect that can survive copying, can involve providing a metameric pair of pattern inks, wherein a first pattern ink reflects higher in an infrared spectrum as compared to a second pattern ink among the metameric pair of pattern inks, wherein the second pattern ink is less reflective than the first pattern ink; for the second pattern ink that is less reflective than the first pattern ink, designing a pattern for the second pattern ink that is larger and less scattered than an existing design for a pattern ink; and using a color of media as a common color for the metameric pair of patterns and inks to create an infrared effect from the metameric pair of pattern inks that survives copying on the media.

In an embodiment of the method, text and/or graphics can be encoded in the metameric pair of pattern inks.

In an embodiment of the method, the media can comprise paper.

In an embodiment of the method, the pattern designed for the second pattern ink can include features that enhance data hiding.

In an embodiment of the method, the metameric pair of pattern inks can be designed with inks having scattered patterns that are sufficient to prevent a modulation transfer function (MTF) of a scanner from filtering out or significantly altering the scattered patterns used with the metameric pair of pattern inks.

In an embodiment, a system for creating an infrared effect that survives copying, can include a metameric pair of pattern inks, wherein a first pattern ink reflects higher in an infrared spectrum as compared to a second pattern ink among the metameric pair of pattern inks, and the second pattern ink is less reflective than the first pattern ink; wherein for the second pattern ink that is less reflective than the first pattern ink, a pattern is configured for the second pattern ink that is larger and less scattered than an existing design for a pattern ink; and wherein a color of media is used as a common color for the metameric pair of pattern inks to create an infrared effect from the metameric pair of pattern inks that survives copying on the media.

In an embodiment of the system, text and/or graphics can be encoded in the metameric pair of pattern inks.

In an embodiment of the system, the media can comprise paper.

In an embodiment of the system, the pattern designed for the second pattern ink can include features that enhance data hiding.

In an embodiment of the system, the metameric pair of pattern inks can be designed with inks having scattered patterns that are sufficient to prevent a modulation transfer function (MTF) of a scanner from filtering out or significantly altering the scattered patterns used with the metameric pair of pattern inks.

In another embodiment, a printing system for rendering an infrared effect that survives copying, can include a processor adapted to: provide a metameric pair of pattern inks, wherein a first pattern ink reflects higher in an infrared spectrum as compared to a second pattern ink among the metameric pair of pattern inks, wherein the second pattern ink is less reflective than the first pattern ink; for the second pattern ink that is less reflective than the first pattern ink, design a pattern for the second pattern ink that is larger and less scattered than an existing design for a pattern ink; and use a color of media as a common color for the metameric pair of pattern inks to render an infrared effect from the metameric pair of pattern inks that survives copying on the media.

In an embodiment of the printing system, text and/or graphics can be encoded in the metameric pair of pattern inks.

In an embodiment of the printing system, the media can comprise paper.

In an embodiment of the printing system, the pattern designed for the second pattern ink can include features that enhance data hiding.

In an embodiment of the printing system, the metameric pair of pattern inks can be designed with inks having scattered patterns that are sufficient to prevent a modulation transfer function (MTF) of a scanner from filtering out or significantly altering the scattered patterns used with the metameric pair of pattern inks.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figure 1:
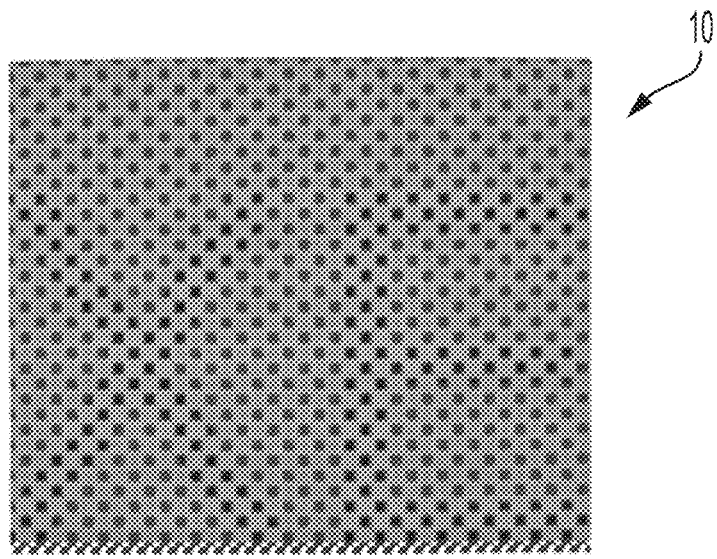
FIG. 1 illustrates an image of IR specialty imaging product.

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein do not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The term "data" as utilized herein can relate to physical signals that can indicate or include information. The term "image" as utilized herein can relate to a pattern of physical light or a collection of data representing the physical light, and may include characters, words, and text as well as other features such as graphics.

The term "digital image" as utilized herein can be by extension an image represented by a collection of digital data. An image may be divided into "segments," each of which is itself an image. A segment of an image may be of any size up to and including the whole image.

The term "image object" or "object" as used herein is believed to be considered in the art generally equivalent to the term "segment" and can be employed herein interchangeably.

In a digital image composed of data representing physical light, each element of data may be called a "pixel," which is common usage in the art and refers to a picture element. Each pixel has a location and value. Each pixel value is a bit in a "binary form" of an image, a gray scale value in a "gray scale form" of an image, or a set of color space coordinates in a "color coordinate form" of an image, the binary form, gray scale form, and color coordinate form each being a two-dimensional array defining an image.

An operation can perform "image processing" when it operates on an item of data that relates to part of an image.

"Contrast" is used to denote the visual difference between items, data points, and the like. It can be measured as a color difference or as a luminance difference or both.

A digital color printing system is an apparatus arrangement suited to accepting image data and rendering that image data upon a substrate, such as, for example, a recording medium. The term 'IR camera' or 'infrared camera' as utilized herein refers to a type of thermographic camera can create an image using infrared (IR) radiation. The term 'infrared' (also referred to sometimes as 'infrared light') can relate to electromagnetic radiation with wavelengths longer than those of visible light. It is therefore invisible to the human eye. IR is generally understood to encompass wavelengths from the nominal red edge of the visible spectrum around 700 nanometers, to 1 millimeter.

The "RGB color model" is an additive color model in which red, green, and blue can be added together in various ways to reproduce a broad array of colors. The name of the model comes from the initials of the three additive primary colors, red, green, and blue.

A primary purpose of the RGB color model is for the sensing, representation, and display of images in electronic systems. RGB is a device-dependent color model: different devices detect or reproduce a given RGB value differently, since the color elements and their response to the individual R, G, and B levels vary from manufacturer to manufacturer, or even in the same device over time. Thus, an RGB value does not define the same color across devices without some kind of color management.

The "CMYK color model" is a subtractive color model, which can be used in color printing, and can also be used to describe the printing process itself. CMYK refers to the four inks used in some color printing: cyan, magenta, yellow, and black.

"Colorant" can refer to one of the fundamental subtractive C, M, Y, K, primaries, which may be realized in formulation as, liquid ink, solid ink, dye, or electrostatographic toner. A "colorant mixture" is a particular combination of C, M, Y, K colorants.

The term 'LAB' as utilized refer can relate to the CIELAB color space (also referred to as L*a*b*), which is a color space defined by the International Commission on Illumination in 1976. It expresses color as three values: L*for perceptual lightness, and a*and b*for the four unique colors of human vision: red, green, blue, and yellow. The term 'LAB' can be utilized interchangeably with L*a*b*.

An "infrared mark" is a watermark embedded in the image that has the property of being relatively indecipherable under normal light, and yet decipherable under infrared illumination by appropriate infrared sensing devices, such as infrared cameras.

"Metameric" rendering/printing is the ability to use multiple colorant combinations to render a single visual color, as can be achieved when printing with more than three colorants.

The word "printer" and the term "printing system" as used herein can encompass any apparatus and/or system; such as a digital copier, xerographic and reprographic printing systems, bookmaking machine, facsimile machine, multi-function machine, ink-jet machine, continuous feed, sheet-fed printing device, etc.; which may contain a print controller and a print engine, and which may perform a print outputting function for any purpose. A digital color printing system is an example of a printer or printing system.

As discussed earlier, many security printing effects may be destroyed or degraded by scanning or copying. This is often desired to be able to tell the original from the copy. A smaller subset of documents involves cases where a copy or the original can be used and hence it is desired to have a security effect survive a copy or scan. Example documents are Veteran DD 214's and social security cards.

Typical IR (infrared) effects may use special IR inks and hence do not copy. Specialty imaging infrared mark text is a popular anti-counterfeiting and anti-forging method that can be used to protect valuable documents such as prescriptions and concert tickets. The mark is generally invisible unless viewed with and IR camera. One issue is that the mark is sometimes able to be copied on a standard office copier, but the effect degrades.

To address this problem, the embodiments involve the creation of a metameric pair of IR inks with one that reflects IR light and the other, which reflects less IR light under office lighting with a watermark created with the inks that is generally invisible and can become visible with an IR camera. These effects can survive copying, even a few times. The inks can be designed with larger less scattered patterns sufficient so that a scanner's MTF (Modulation Transfer Function) does not filter out or significantly alter the patterns.

FIG. 1 illustrates an image 10 of an IR specialty imaging product. In the example shown in FIG. 1, the image 10 includes a background textbox composed of RBCM (red/ blue/cyan/magenta) and the text "XE", which adds K (black) but loses CR. Magenta is a common color. At a normal print size of, for example, 7/16" both patterns appear to be about the same but zooming in shows the details. The small size and color to color edges are lost on a first copy. Note that all colors are 100% on spot colors. It should be appreciated that although FIG. 1 is shown in this rendering in black and white, the original image rendered, upon which image 10 is based, was in color. This is also true for the other various images shown in the other figures herein.

Figure 2:
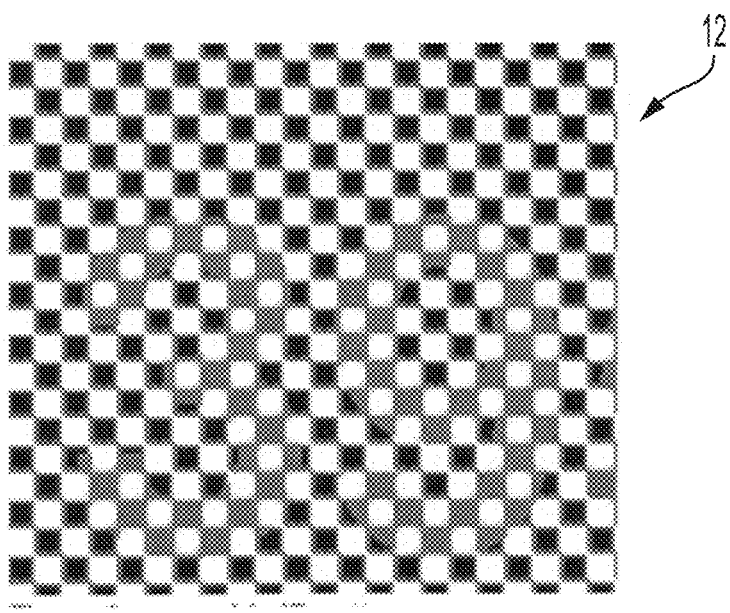
FIG. 2 illustrates an image of an improved IR specialty product with copyable IR patterns, in accordance with an embodiment

FIG. 2 illustrates an image 12 of an improved IR specialty product with copyable IR patterns, in accordance with an embodiment. The image 12 shown in FIG. 1 can be rendered by the following approach:

1) Create a metameric pair of pattern inks where one ink reflects higher in the IR spectrum as compared to the other;
2) In addition, the pair of inks should appear to be a single color/pattern at printed size;
3) For the ink that is less reflective design the pattern to be larger and less scattered than the current design;
4) Use paper (e.g., white) as the common color (e.g., magenta used in FIG. 1); and
5) Encode text and/or graphics in the inks.

Figure 11:
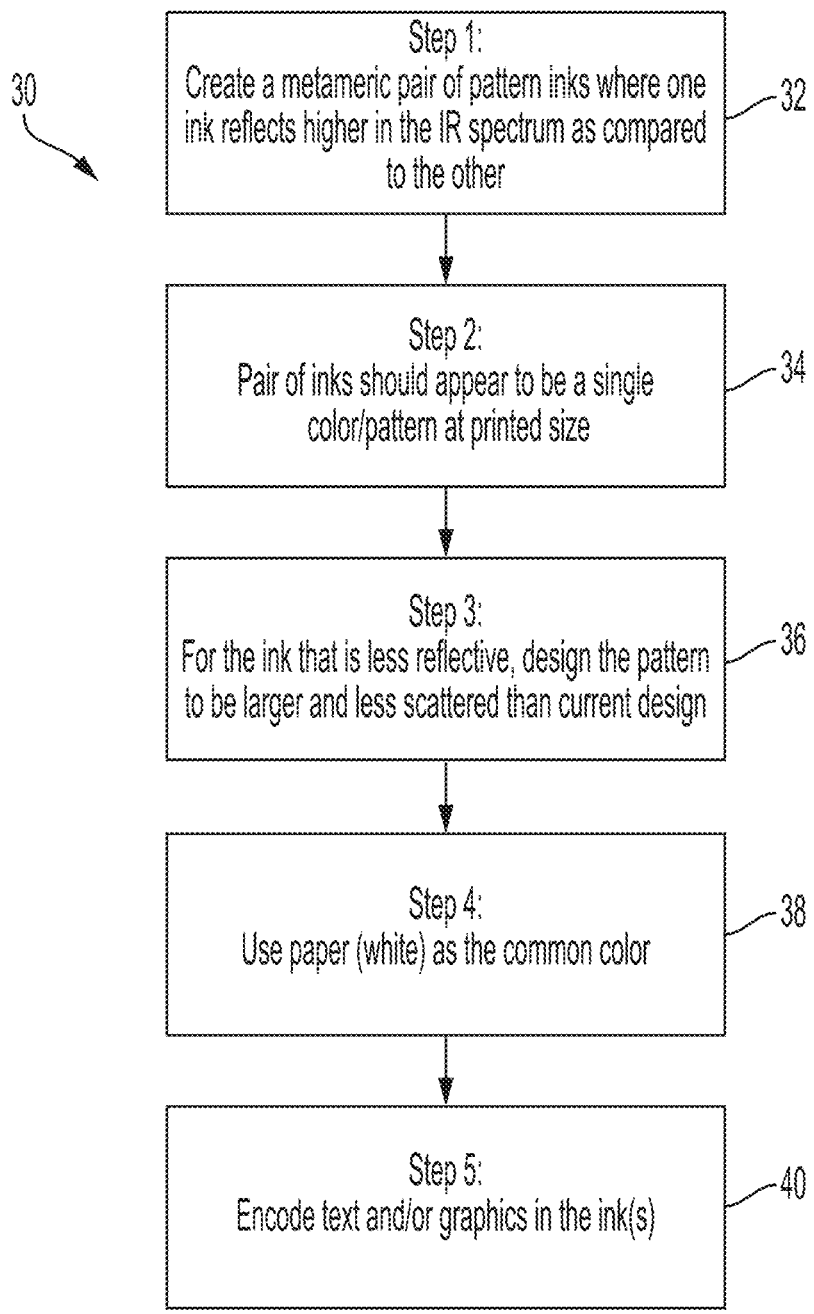
FIG. 11 illustrates a flow chart of operations depicting logical operational steps of a method for creating an infrared effect that can survive copying, in accordance with an embodiment.

The above methodology is also described herein with respect to FIG. 11. In the image 12 depicted in FIG. 2, the number '39' is visible. As a result of following the steps above, the image 12 is based on inks, which can be designed with larger less scattered patterns that are sufficient so that a scanner's MTF (Modulation Transfer Function) does not filter out or significantly alter the pattern(s).

Figure 3:
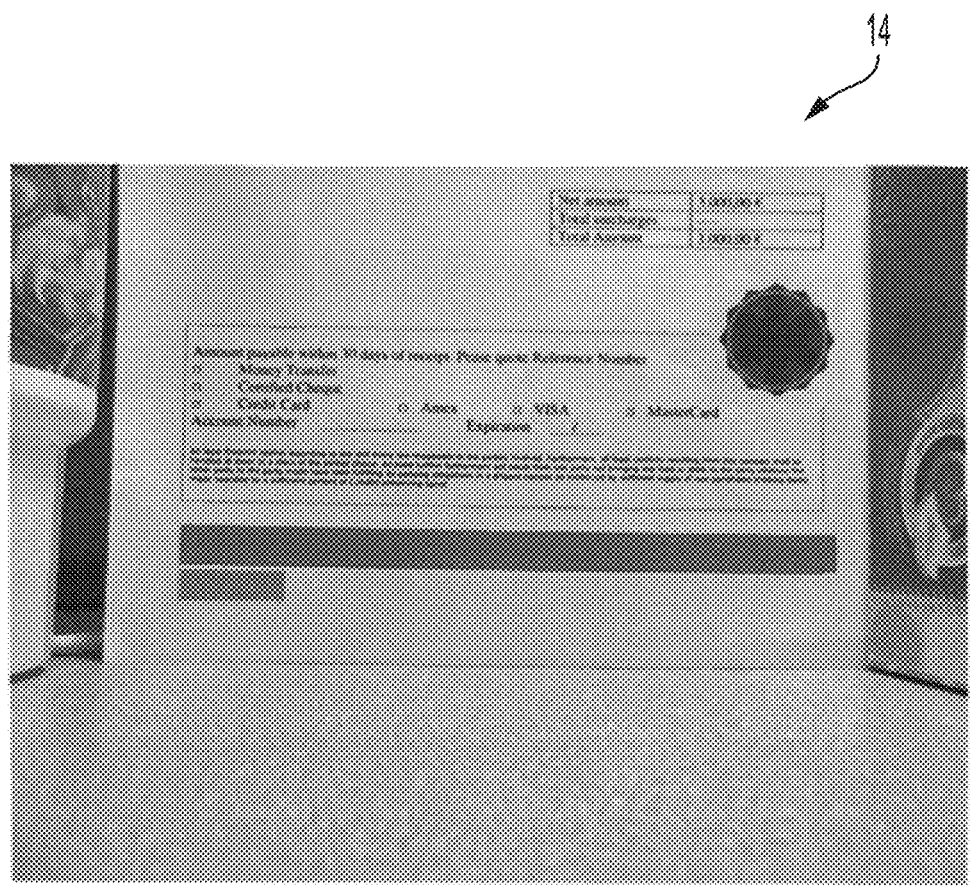
FIG. 3 illustrates an image of an original document with office lighting, in accordance with an embodiment
Figure 4:
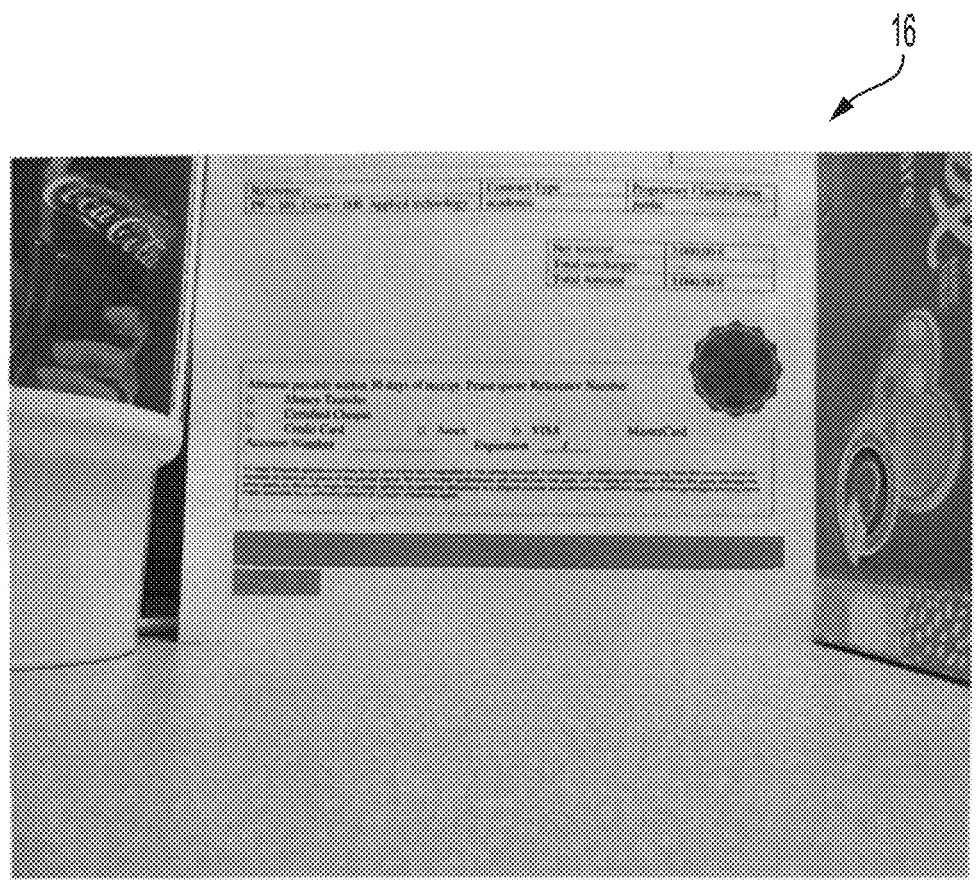
FIG. 4 illustrates an image of a copy of the document shown in FIG. 3 and with office lighting, in accordance with an embodiment.
Figure 5:
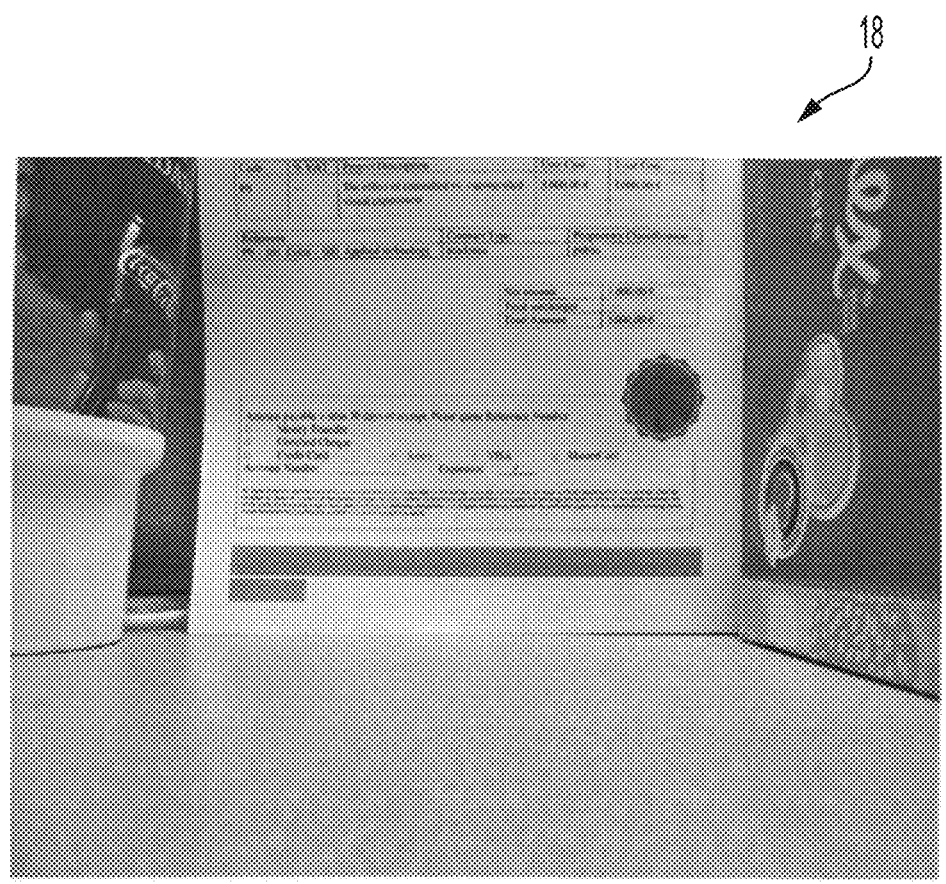
FIG. 5 illustrates an image of a copy of the copy shown in FIG. 4 with IR lighting, in accordance with an embodiment.
Figure 6:
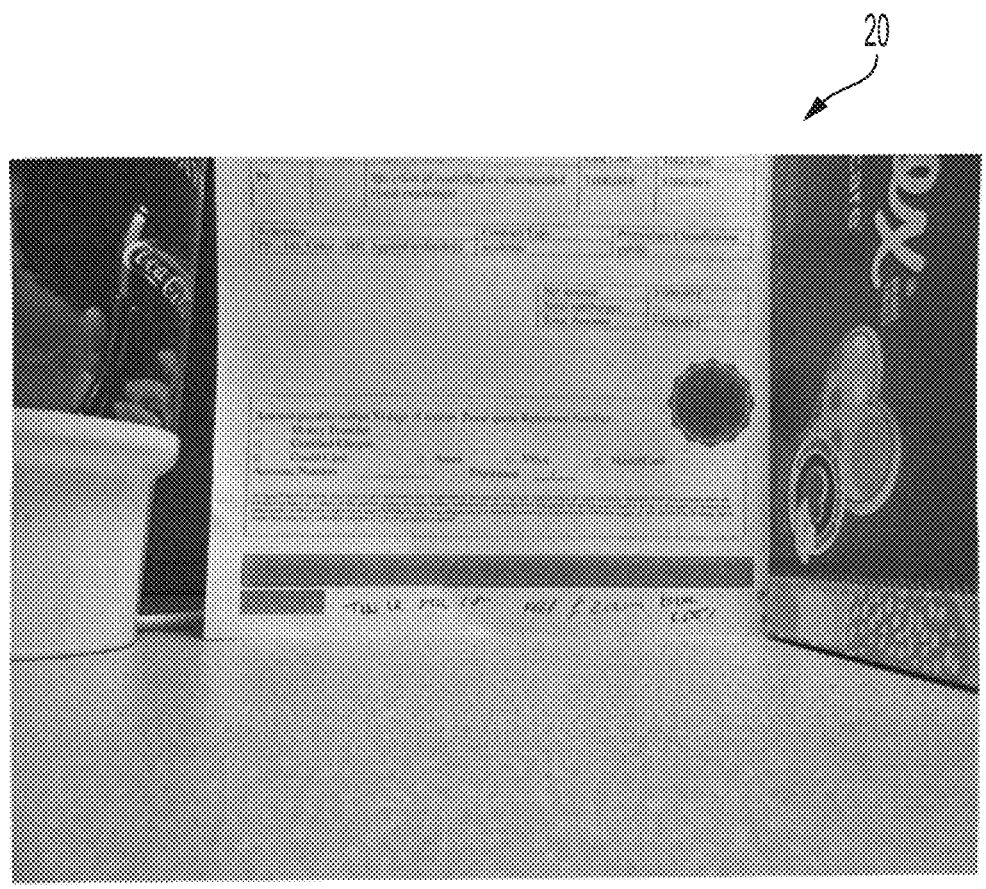
FIG. 6 illustrate an image of a copy of the copy shown in FIG. 4 with IR lighting, in accordance with an embodiment.

FIG. 3 illustrates an image 14 of an original document with office lighting, in accordance with an embodiment. FIG. 4 illustrates an image 16 of a copy of the document shown in FIG. 3 and with office lighting, in accordance with an embodiment. FIG. 5 illustrates an image 18 of a copy of the copy shown in FIG. 4 with IR lighting, in accordance with an embodiment. FIG. 6 illustrate an image 20 of a copy of the copy shown in FIG. 4 with IR lighting, in accordance with an embodiment. FIG. 3 to FIG. 6 depict the original (old) IR mark text (magenta rectangle) and the new copyable IR mark text (cyan rectangle) as more copies are made. While lightening the text never becomes readable for either.

Figure 7:
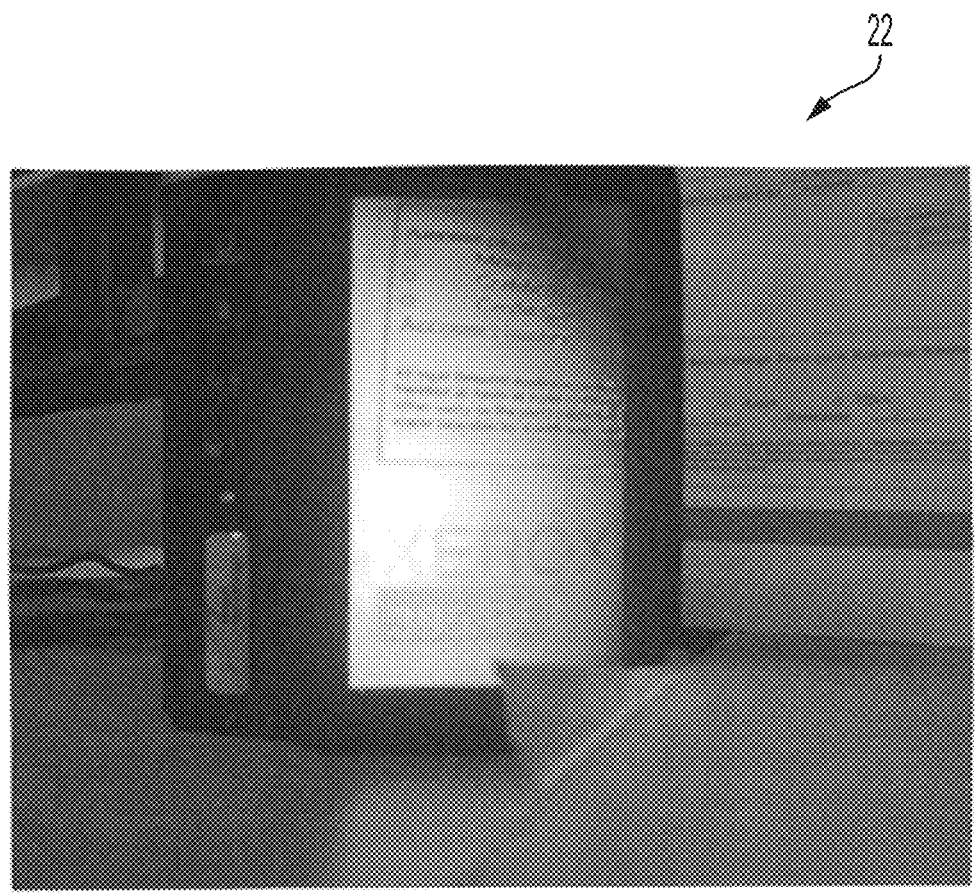
FIG. 7 illustrates an image of a document seen with an IR camera, in accordance with an embodiment.
Figure 8:
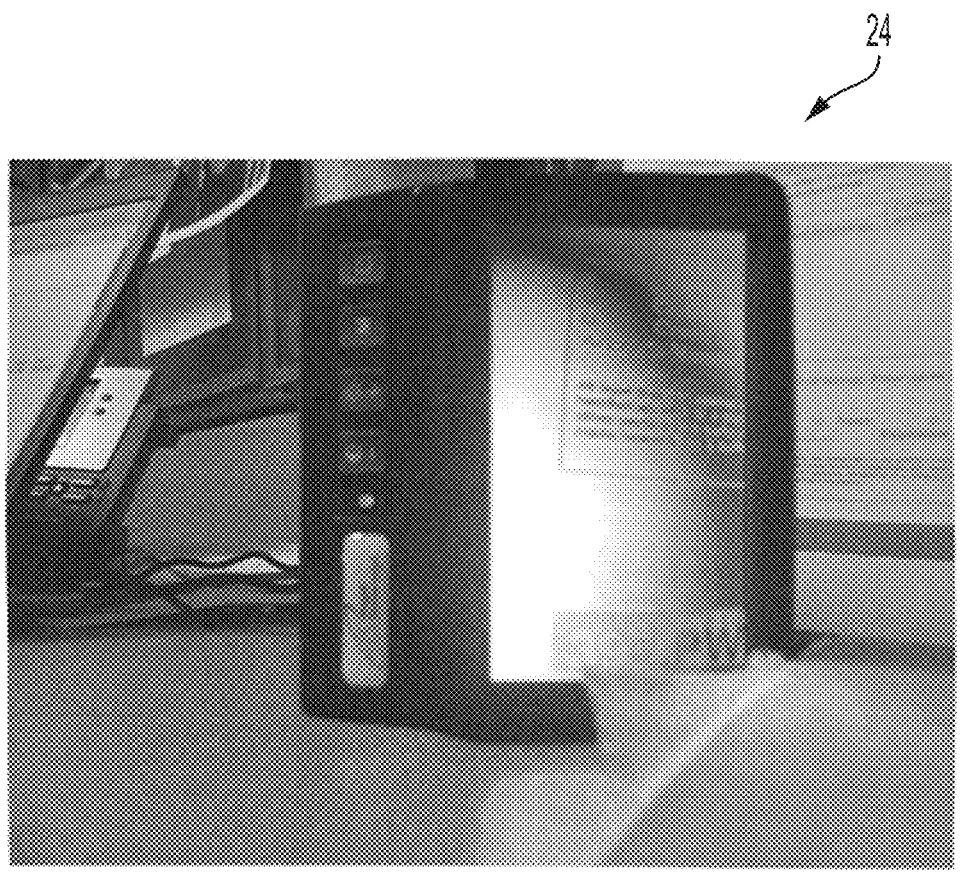
FIG. 8 illustrates an image of a copy of a document seen with an IR camera in accordance with an embodiment.
Figure 9:
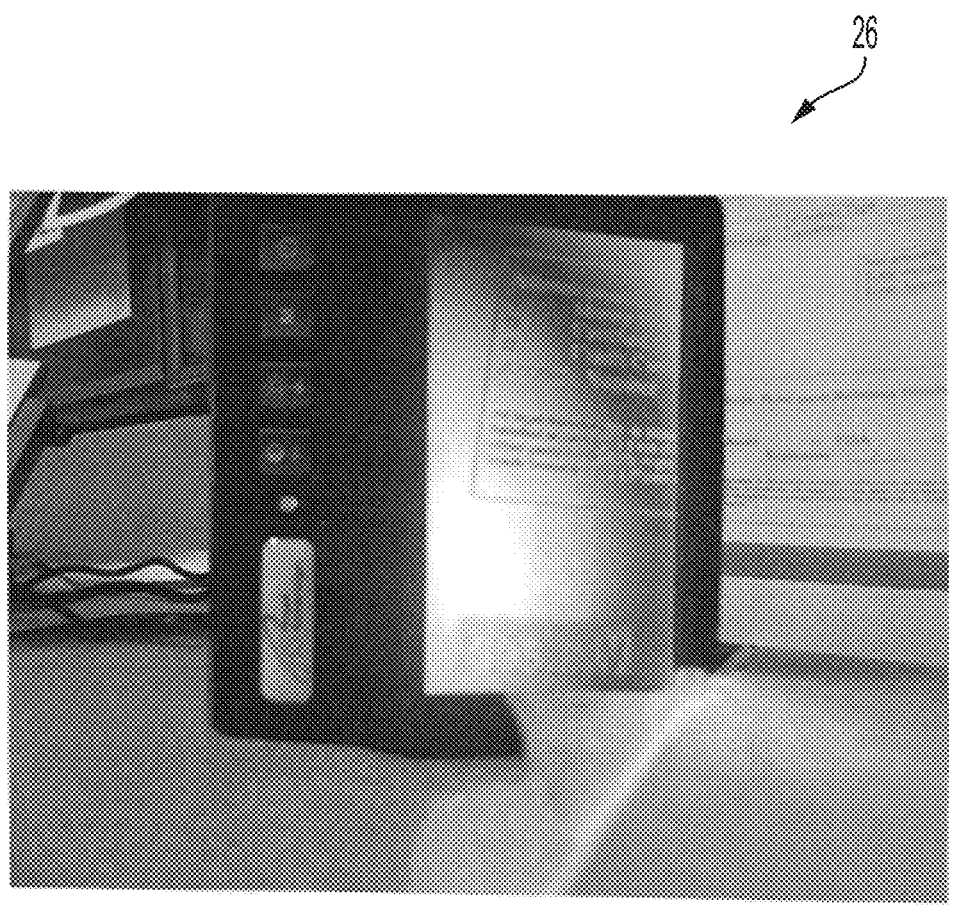
FIG. 9 illustrates an image of a copy of a copy of a document seen with an IR camera, in accordance with an embodiment.
Figure 10:
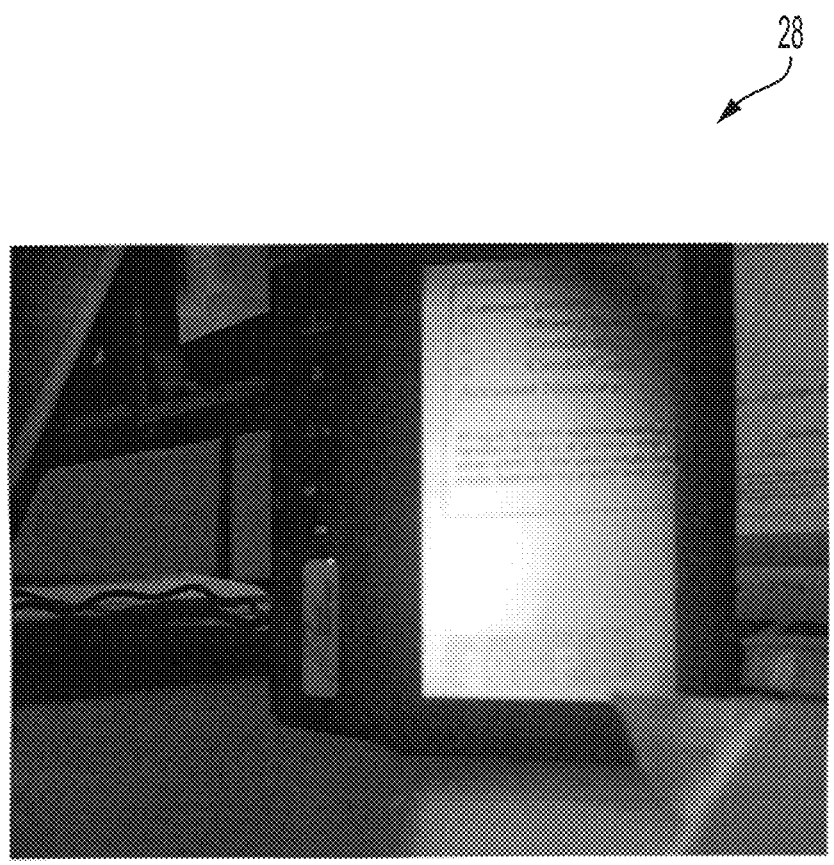
FIG. 10 illustrates an image of a copy of a copy of a copy seen with an IR camera, in accordance with an embodiment.

FIG. 7 illustrates an image 22 of a document seen with an IR camera, in accordance with an embodiment. FIG. 8 illustrates an image 24 of a copy of a document seen with an IR camera in accordance with an embodiment. FIG. 9 illustrates an image 26 of a copy of a copy of a document seen with an IR camera, in accordance with an embodiment. FIG. 10 illustrates an image 28 of a copy of a copy of a copy seen with an IR camera, in accordance with an embodiment.

The images shown in FIG. 7 to FIG. 10 depict the prints from FIGS. 3-6 as seen with an IR camera. The text is easily readable for both rectangles in FIG. 7, but the photograph washes out part of the picture. As the copies go on the original IR text degrades and becomes unreadable while the new IR text continues to work well. Note that the image 24 shown in FIG. 8 appears like the new IR text but is more readable as compared to the image 22 depicted in FIG. 7.

FIG. 11 illustrates a flow chart of operations depicting logical operational steps of a method 30 for implementing an infrared effect preserved on a copy, in accordance with an embodiment. The method 30 shown in FIG. 11 describes steps, operations, and/or instructions of a specialty imaging technique for creating an IR effect that can survive copying. As depicted at block 32, a step or operation can be implemented to create a metameric pair of pattern inks where one ink reflects higher in the IR spectrum as compared to the other. Thereafter, as indicated at block 34, a step or operation can be implemented to verify or confirm that the pair of inks should appear to be a single color/pattern at printed size.

Next, as shown at block 36, for the ink that is less reflective, the pattern can be designed to be larger and less scattered than the current design. Next, as depicted at block 38, a step or operation can be implemented in which paper (e.g., white) can be used as the common color (e.g., magenta used in FIG. 1). Then, as depicted at block 40, a step or operation can be implemented to encode text and/or graphics in the inks. Note that the method 30 described above and elsewhere herein can be implemented by a printing system such as the printing system shown 100 shown in FIG. 13.

The method 30 can be used to create an IR effect that can survive copying. Unlike conventional IR methods, this effect can occur on a white (media) background instead of the standard constant color (e.g., typically spot color/primary). The design pattern can include additional features (e.g., red outlining on cyan blocks and cyan outlining on black blocks) that can improve the data hiding.

Benefits of the embodiments can include the ability to have hidden security features that are fragile and others that are robust. The fragile features do not survive copying, but the robust ones will; this allows us to detect if a copy has been made and to have hidden data persist through copying where the copy is acceptable but not preferred. The ink pair choice for encoding the hidden data and use of a white background facilitate this; red can be used around the cyan blocks to give it a more neutral appearance (i.e., match the black blocks) and cyan can be used around black blocks to promote a more cyan appearance. The hidden data can be used for data verification, e.g., to see if any key fields have been altered in the copy.

Figure 12:
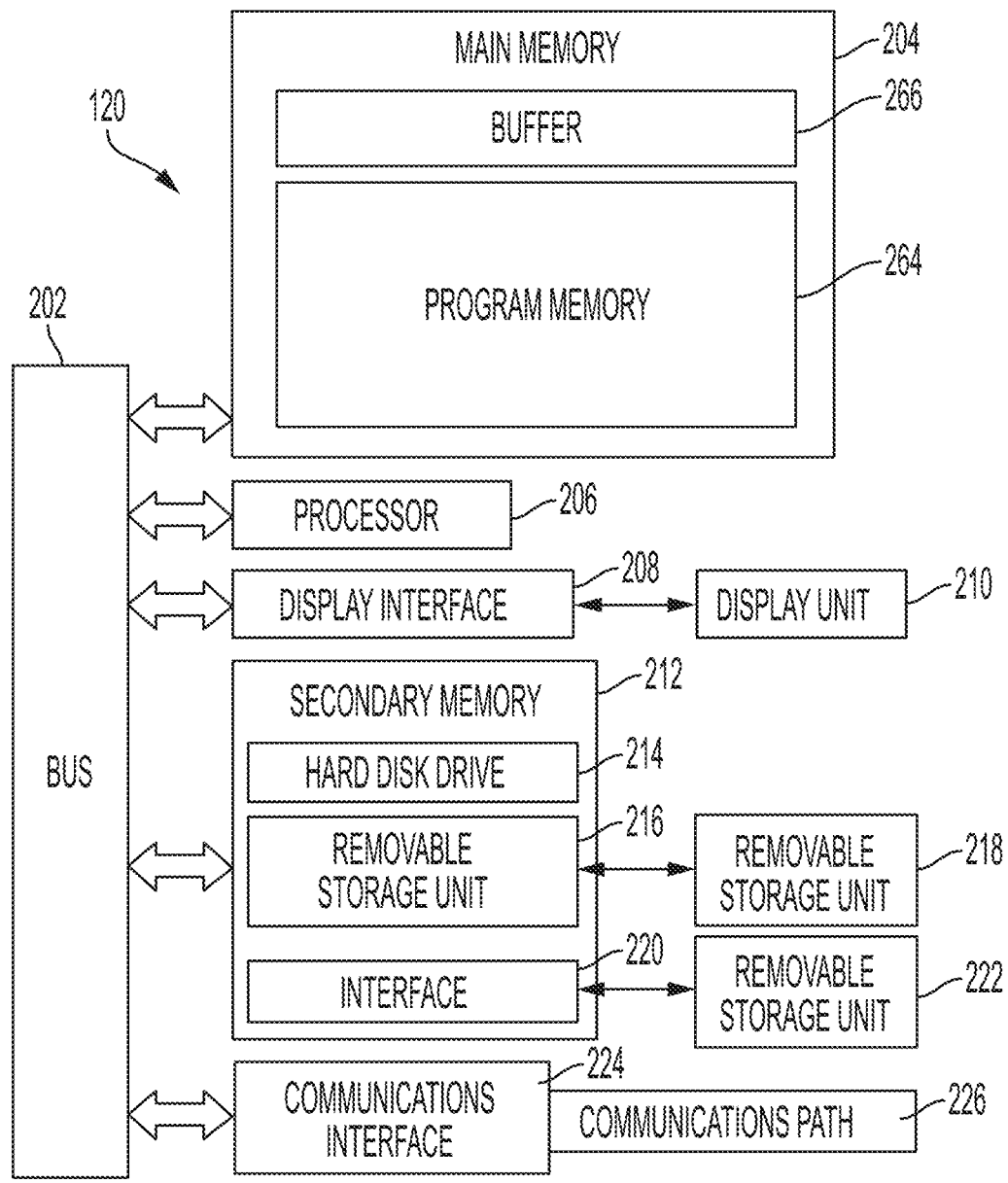
FIG. 12 illustrates a block diagram of a digital front-end controller of a printing system suitable for implementing one or more aspects of the exemplary methods described herein.

FIG. 12 illustrates a block diagram of a digital front-end (DFE) controller 120 useful for implementing one or more aspects of the exemplary methods described herein. With respect to FIG. 12, an exemplary digital front-end controller 120 is shown in greater detail. The digital front-end controller 120 can include one or more processors, such as processor 206 capable of executing machine executable program instructions.

Note that the term digital front-end (DEF) as utilized herein can relate to a workflow touchpoint that can accept a print file (e.g., a pdf or PostScript file) and can turn the print file into a format that a print engine (e.g., toner or inkjet) can use to lay down the content on a substrate (e.g., print media, etc.). In an embodiment, a DFE can be a raster image processor (RIP) but may include much more depending on the type of device/system in which the DFE is implemented. A DFE controller thus can comprise a device, program, and/or system for controlling the DFE of a printing system.

In the embodiment shown in FIG. 12, the processor 206 can communicate with a bus 202 (e.g., a backplane interface bus, cross-over bar, or data network, etc.). The digital front-end controller 120 also can include a main memory 204 that can store machine-readable instructions. The main memory 204 is thus capable of storing data. The main memory 204 may alternatively include random access memory (RAM) to support reprogramming and flexible data storage. A buffer 266 can be used to temporarily store data for access by the processor. The main memory 204 can also include a program memory 264 that can comprise, for example, executable programs that can implement one or more of the embodiments of the methods described herein.

The program memory 264 can store at least a subset of the data contained in the buffer 266.

The digital front-end controller 120 can include a display interface 208 that can forward data from the communication bus 202 (or from a frame buffer not shown) to a display 210. The digital front-end controller 120 also can comprise a secondary memory 212, which may include, for example, a hard disk drive 214 and/or a removable storage drive 216, which can read and write data to removable storage 218, such as a floppy disk, magnetic tape, optical disk, etc., that can store computer software and/or data.

The secondary memory 212 alternatively can include other similar mechanisms for allowing computer programs or other instructions to be loaded into the computer system. Such mechanisms can include, for example, a removable storage unit 222 adapted to exchange data through an interface 220.

Examples of such mechanisms include a program cartridge and cartridge interface (such as that found in video game devices), a removable memory chip (such as an EPROM or PROM) and associated socket, and other removable units and interfaces, which allow software and data to be transferred.

The digital front-end (DFE) controller 120 can include a communications interface 224, which can act as both input and output to allow software and data to be transferred between the digital front-end controller 120 and external devices. Examples of a communications interface include a modem, a network interface (such as an Ethernet card), a communications port, a PCMCIA slot and card, etc.

Computer programs (also called computer control logic) may be stored in main memory 204 and/or secondary memory 212. Computer programs may also be received via a communications interface 224, which is associated with a communications path 226. Such computer programs, when executed, can enable the computer system to perform the features and capabilities provided herein such as, for example, the instructions, operations, or steps shown at blocks 32 to 40 in FIG. 11 and described elsewhere herein. Software and data transferred via the communications interface can be in the form of signals which may be, for example, electronic, electromagnetic, optical, or other signals capable of being received by a communications interface.

These signals can be provided to the communications interface 224 via the communications path 226 (i.e., channel), which can carry signals and may be implemented using wire, cable, fiber optic, phone line, cellular link, RF, or other communications channels. Part of the data generally stored in secondary memory 212 for access during digital front-end operation can be a set of translation tables that can convert an incoming color signal into a physical machine signal. This color signal can be expressed either as a colorimetric value, usually three components as L*a*b*, RGB, XYZ, etc., into physical exposure signals for the four toners cyan, magenta, yellow, and black. These tables can be created outside of the digital front-end and downloaded and may be optionally created within the digital front-end in a so-called characterization.

Figure 13:
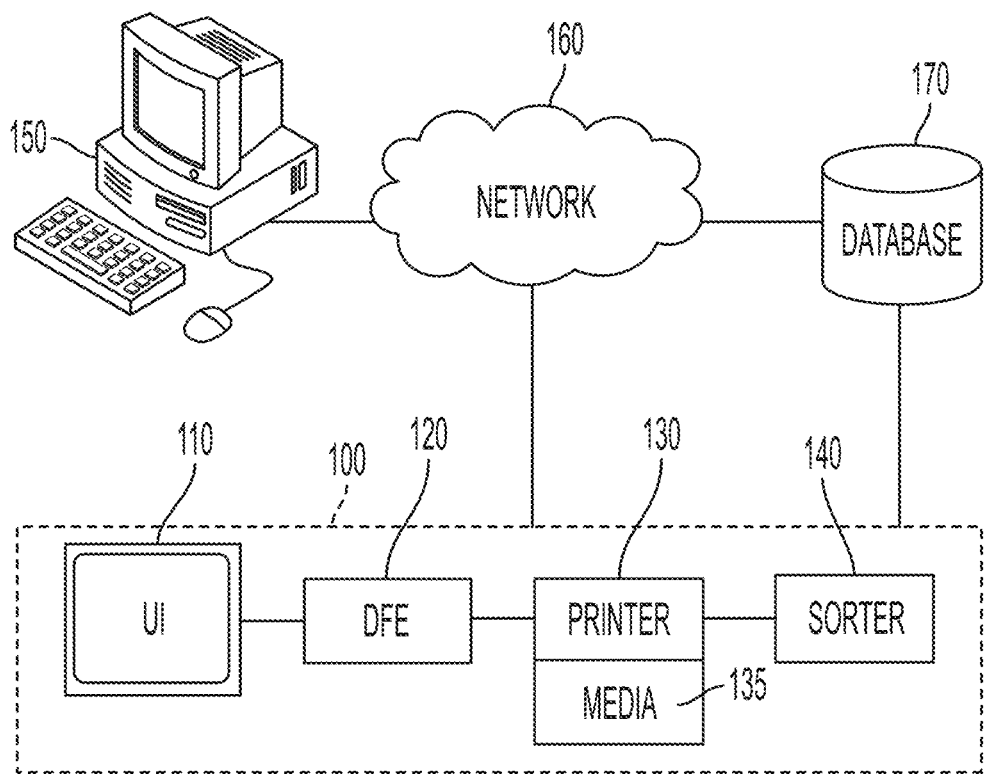
FIG. 13 illustrates a block diagram of digital front-end controller useful for implementing one or more aspects of the exemplary methods described herein.

FIG. 13 illustrates a block diagram of a printing system (or image rendering system) 100, which can be suitable for implementing various aspects of the exemplary embodiments described herein. Note that as utilized herein, the word "printer" and the term "printing system" can encompass any apparatus and/or system, such as a digital copier, xerographic and reprographic printing systems, bookmaking machine, facsimile machine, multi-function machine, ink-jet machine, continuous feed, sheet-fed printing device, etc., which may contain a print controller and a print engine, and which may perform a print outputting function for any purpose.

The printing system 100 depicted in FIG. 13 can function in some embodiments as a digital color printing system, and can include a user interface 110, a digital front-end (DFE) controller 120, and a print engine 130 that can access the print media 135 (e.g., substrate(s)) of various sizes and/or costs for a print job. The user interface 110 can communicate bidirectionally with the DFE controller 120, which in turn can communicate bidirectionally with the print engine 130. The printing system 100 can also include a sorter 140 that can communicate bidirectionally with the print engine 130.

A "print job" or "document" is normally a set of related sheets, usually one or more collated copy sets copied from a set of original print job sheets or electronic document page images, from a particular user, or otherwise related. For submission of a regular print job (or customer job), digital data can be sent to the printing system 100. Note that the DFE controller 120 shown in FIG. 12 can be implemented by or as the DFE controller 120 illustrated in FIG. 13. That is, the DFE controller 120 shown in FIG. 12 can be incorporated into the printing system 100 shown in FIG. 13.

In an embodiment, the sorter 140 can operate after or with the print engine 130 to manage arrangement of the hard copy output, including cutting functions, facilitating printing/rendering of a job. A user can access and operate the printing system 100 using the user interface 110 or via a data-processing apparatus. The data-processing apparatus can communicate with the printing system 100 via a data network 160 (e.g., a packet-based bidirectional wireless communications network, etc.).

A user profile, a work product for printing, a media library, and various print job parameters can be stored in a database or memory 170 accessible by the data-processing apparatus or the printing system 100 via the data network 160, or such data can be directly accessed via the printing system 100. One or more color sensors (not shown) may be embedded in the printer paper path, as known in the art.

The claims, description, and drawings of this application may describe one or more of the instant technologies in operational/functional language, for example, as a set of operations to be performed by a computer. Such operational/functional description in most instances can be specifically-configured hardware (e.g., because a general purpose computer in effect becomes a special-purpose computer once it is programmed to perform particular functions pursuant to instructions from program software). Note that the data-processing systems and devices discussed herein may be implemented as a general purpose computer or a special-purpose computer in some embodiments. That is, data-processing systems can be programmed to perform the aforementioned particular instructions thereby becoming in effect a special-purpose computer. In some situations, a printing device or printing system may be a special-purpose computer. Thus, the DFE controller 120 shown in FIG. 12 may be implemented in some embodiments as a special purpose computer or with a special purpose computer. Similarly, in other embodiments, the DFE controller 120 shown in FIG. 13 may be implemented as a special-purpose computer or in association with a special-purpose controller.

Based on the foregoing, it can be appreciated that a number of embodiments, some of which are preferred embodiments and some of which are alternative embodiments, are described and illustrated herein. For example, in an embodiment, a method of creating an infrared effect that can survive copying, can involve providing a metameric pair of pattern inks, wherein a first pattern ink reflects higher in an infrared spectrum as compared to a second pattern ink among the metameric pair of pattern inks, wherein the second pattern ink is less reflective than the first pattern ink; for the second pattern ink that is less reflective than the first pattern ink, designing a pattern for the second pattern ink that is larger and less scattered than an existing design for a pattern ink; and using a color of media as a common color for the metameric pair of patterns and inks to create an infrared effect from the metameric pair of pattern inks that survives copying on the media.

In an embodiment of the method, text and/or graphics can be encoded in the metameric pair of pattern inks.

In an embodiment of the method, the media can comprise paper.

In an embodiment of the method, the pattern designed for the second pattern ink can include features that enhance data hiding.

In an embodiment of the method, the metameric pair of pattern inks can be designed with inks having scattered patterns that are sufficient to prevent a modulation transfer function (MTF) of a scanner from filtering out or significantly altering the scattered patterns used with the metameric pair of pattern inks.

In an embodiment, a system for creating an infrared effect that survives copying, can include a metameric pair of pattern inks, wherein a first pattern ink reflects higher in an infrared spectrum as compared to a second pattern ink among the metameric pair of pattern inks, and the second pattern ink is less reflective than the first pattern ink; wherein for the second pattern ink that is less reflective than the first pattern ink, a pattern is configured for the second pattern ink that is larger and less scattered than an existing design for a pattern ink; and wherein a color of media is used as a common color for the metameric pair of pattern inks to create an infrared effect from the metameric pair of pattern inks that survives copying on the media.

In an embodiment of the system, text and/or graphics can be encoded in the metameric pair of pattern inks.

In an embodiment of the system, the media can comprise paper.

In an embodiment of the system, the pattern designed for the second pattern ink can include features that enhance data hiding.

In an embodiment of the system, the metameric pair of pattern inks can be designed with inks having scattered patterns that are sufficient to prevent a modulation transfer function (MTF) of a scanner from filtering out or significantly altering the scattered patterns used with the metameric pair of pattern inks.

In another embodiment, a printing system for rendering an infrared effect that survives copying, can include a processor adapted to: provide a metameric pair of pattern inks, wherein a first pattern ink reflects higher in an infrared spectrum as compared to a second pattern ink among the metameric pair of pattern inks, wherein the second pattern ink is less reflective than the first pattern ink; for the second pattern ink that is less reflective than the first pattern ink, design a pattern for the second pattern ink that is larger and less scattered than an existing design for a pattern ink; and use a color of media as a common color for the metameric pair of pattern inks to render an infrared effect from the metameric pair of pattern inks that survives copying on the media.

In an embodiment of the printing system, text and/or graphics can be encoded in the metameric pair of pattern inks.

In an embodiment of the printing system, the media can comprise paper.

In an embodiment of the printing system, the pattern designed for the second pattern ink can include features that enhance data hiding.

In an embodiment of the printing system, the metameric pair of pattern inks can be designed with inks having scattered patterns that are sufficient to prevent a modulation transfer function (MTF) of a scanner from filtering out or significantly altering the scattered patterns used with the metameric pair of pattern inks.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A method of creating an infrared effect that survives copying, comprising:
   providing a metameric pair of pattern inks, wherein a first pattern ink reflects higher in an infrared spectrum as compared to a second pattern ink among the metameric pair of pattern inks, wherein the second pattern ink is less reflective than the first pattern ink;
   for the second pattern ink that is less reflective than the first pattern ink, designing a pattern for the second pattern ink that is larger and less scattered than an existing design for a pattern ink;
   using a color of media as a common color for the metameric pair of pattern inks to create an infrared effect from the metameric pair of pattern inks that survives copying on the media.

2. The method of claim 1 further comprising encoding text in the metameric pair of pattern inks.

3. The method of claim 1 further comprising encoding graphics in the metameric pair of pattern inks.

4. The method of claim 1 further comprising encoding text and graphics in the metameric pair of pattern inks.

5. The method of claim 1 wherein the media comprises paper.

6. The method of claim 1 wherein the pattern designed for the second pattern ink includes features that enhance data hiding.

7. The method of claim 1 further comprising:
   designing the metameric pair of pattern inks with inks having scattered patterns that are sufficient to prevent a modulation transfer function (MTF) of a scanner from filtering out or significantly altering the scattered patterns used with the metameric pair of pattern inks.

8. A system for creating an infrared effect that survives copying, comprising:
   a metameric pair of pattern inks, wherein a first pattern ink reflects higher in an infrared spectrum as compared to a second pattern ink among the metameric pair of pattern inks, and the second pattern ink is less reflective than the first pattern ink;
   wherein for the second pattern ink that is less reflective than the first pattern ink, a pattern is configured for the second pattern ink that is larger and less scattered than an existing design for a pattern ink; and wherein a color of media is used as a common color for the metameric pair of pattern inks to create an infrared effect from the metameric pair of pattern inks that survives copying on the media.

9. The system of claim 8 text is encoded in the metameric pair of pattern inks.

10. The system of claim 8 wherein graphics are encoded in the metameric pair of pattern inks.

11. The system of claim 8 where text and graphics are encoded in the metameric pair of pattern inks.

12. The system of claim 8 wherein the media comprises paper.

13. The system of claim 8 wherein the pattern designed for the second pattern ink includes features that enhance data hiding.

14. The system of claim 8 wherein the metameric pair of pattern inks is configured with inks having scattered patterns that prevent a modulation transfer function (MTF) of a scanner from filtering out or significantly altering the scattered patterns used with the metameric pair of pattern inks.

15. A printing system for rendering an infrared effect that survives copying, comprising:
   a processor adapted to:
      provide a metameric pair of pattern inks, wherein a first pattern ink reflects higher in an infrared spectrum as compared to a second pattern ink among the metameric pair of pattern inks, wherein the second pattern ink is less reflective than the first pattern ink;
      for the second pattern ink that is less reflective than the first pattern ink, design a pattern for the second pattern ink that is larger and less scattered than an existing design for a pattern ink; and
      use a color of media as a common color for the metameric pair of pattern inks to render an infrared effect from the metameric pair of pattern inks that survives copying on the media.

16. The printing system of claim 15 wherein text is encoded in the metameric pair of pattern inks.

17. The printing system of claim 15 wherein graphics are encoded in the metameric pair of pattern inks.

18. The printing system of claim 15 wherein text and graphics are encoded in the metameric pair of pattern inks.

19. The printing system of claim 15 wherein the media comprises paper.

20. The printing system of claim 15 wherein the pattern designed for the second pattern ink includes features that enhance data hiding.

\* \* \* \* \*